US006847594B1

(12) United States Patent
Lee

(10) Patent No.: US 6,847,594 B1
(45) Date of Patent: Jan. 25, 2005

(54) RECORDING MEDIUM HAVING WOBBLED GROOVE TRACKS OUT OF PHASE WITH WOBBLED LAND TRACKS, SERVO CONTROLLING APPARATUS USING WOBBLE SIGNAL AND METHOD THEREOF

(75) Inventor: Kyung-Geun Lee, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/499,031

(22) Filed: Feb. 7, 2000

(51) Int. Cl.[7] .................................................. G11B 7/00

(52) U.S. Cl. ................................ 369/44.13; 369/275.3; 369/47.27

(58) Field of Search ........................... 369/44.13, 275.3, 369/44.11, 47.27, 44.42, 44.26, 275.4

(56) References Cited

U.S. PATENT DOCUMENTS

| | | | | |
|---|---|---|---|---|
| 5,508,991 A | | 4/1996 | Onigata et al. | 369/106 |
| 5,537,373 A | * | 7/1996 | Horikiri | 369/44.13 |
| 6,069,870 A | * | 5/2000 | Maeda et al. | 369/44.13 |
| 6,088,307 A | * | 7/2000 | Fushimi et al. | 369/44.13 |
| 6,163,521 A | * | 12/2000 | Konishi et al. | 369/44.13 |
| 6,167,022 A | * | 12/2000 | Ishida et al. | 369/44.13 |
| 6,175,540 B1 | * | 1/2001 | Kim | 369/44.13 |
| 6,181,658 B1 | * | 1/2001 | Van Den Enden et al. | 369/44.26 |
| 6,208,614 B1 | * | 3/2001 | Kim | 369/44.13 |
| 6,621,772 B2 | * | 9/2003 | Asano et al. | 369/44.26 |

FOREIGN PATENT DOCUMENTS

| | | |
|---|---|---|
| CN | 1195171 | 10/1998 |
| EP | 0 838 808 A2 | 4/1998 |
| EP | 0 886 275 A1 | 12/1998 |
| JP | 6-96447 | 4/1994 |
| JP | 7-14172 | 1/1995 |
| JP | 9-282699 | 10/1997 |
| JP | 11-25606 | 1/1999 |
| JP | 11-77660 | 1/1999 |
| JP | 11-53772 | 2/1999 |
| WO | WO98/13823 | 4/1998 |

OTHER PUBLICATIONS

Patent Abstracts of Japan , vol. 1999, No. 0430, Apr. 30, 1999 & JP 11 007660 A, Jan. 12, 1999.

Patent Abstracts of Japan, vol. 1999, No. 0430, Apr. 30, 1999 & JP 11 016175 A, Jan. 2, 1999.

* cited by examiner

*Primary Examiner*—Nabil Hindi
(74) *Attorney, Agent, or Firm*—Staas & Halsey LLP

(57) ABSTRACT

A recording medium having wobbled groove tracks out of phase with wobbled land tracks, a servo controlling apparatus using a wobble signal and a method thereof. The recording medium has land tracks and groove tracks, wherein both the land tracks and the groove tracks are wobbled, and wherein the wobbles of either individual groove tracks or individual land tracks are out of phase and the wobbles of the other type of individual tracks are in phase. Thus, it is possible to reliably address whether a groove (or land) track which is currently tracked by the pickup unit is a groove track or a land track, thereby ensuring addressing, and servo control can be effectively performed.

4 Claims, 7 Drawing Sheets

OUTER
GROOVE SECTOR #(m+2N−1)
HEADER FIELD #(m+2N)
GROOVE SECTOR #(m+2N)
LAND SECTOR #(m+2N−1)
HEADER FIELD #(m+2N)
LAND SECTOR #(m+2N)
GROOVE SECTOR #(m+N−1)
HEADER FIELD #(m+N)
GROOVE SECTOR #(m+N)
LAND SECTOR #(m+N−1)
HEADER FIELD #(m+N)
LAND SECTOR #(m+N)
GROOVE SECTOR #(m−1)
HEADER FIELD #(m)
GROOVE SECTOR #(m)
HEADER FIELD
INNER

RECORDING MEDIUM HAVING WOBBLED GROOVE TRACKS OUT OF PHASE WITH WOBBLED LAND TRACKS, SERVO CONTROLLING APPARATUS USING WOBBLE SIGNAL AND METHOD THEREOF

CROSS-REFERENCE TO RELATED APPLICATIONS

This application claims the benefit of Korean Application No. 99-3956, filed Feb. 5, 1999, in the Korean Patent Office, the disclosure of which is incorporated herein by reference.

BACKGROUND OF THE INVENTION

1. Field of the Invention

The present invention relates to an optical disk, and more particularly, to a recording medium having wobbled groove tracks which are out of phase with wobbled land tracks, a servo controlling apparatus for stably controlling movement of a pickup using a wobble signal picked up from the recording medium, and a method thereof.

2. Description of the Related Art

In order to record and/or reproduce images of a high definition television (HDTV) level, large-capacity recording and high-speed reproduction are necessary. Thus, there has been increasing demand for multi-media technology by which a large amount of information can be recorded and/or reproduced on a recording medium such as a rewritable or read-only high-density digital versatile disk (HD-DVD).

In order to satisfy the demand for large-capacity recording and high-speed reproduction, various kinds of methods have been proposed. For example, the area of a disk or the revolution speed may be increased, which is, however, impractical due to an increase in the size or volume of a disk or disk player and an increase in the manufacturing cost. Thus, increasing the recording density per unit area is more effective and desirable.

The size of a laser spot is proportional to the laser wavelength (λ) and is inversely proportional to the numerical aperture (NA) of an objective lens. Thus, in order to increase the recording density per unit area, the laser wavelength must be reduced or a track pitch must be reduced using an objective lens having a high NA. In rewritable or read-only HD-DVDs which are likely to see widespread use in the near future, the track pitch is reduced to about 0.30 to 0.34 μm. Thus, it is important for an optical pick-up unit (hereinafter, to be referred to simply as a pickup) to move to a desired position where data is written or read, and for it to be positioned thereon without error.

In disks to which a land/groove recording method is applied, the capability of a pickup to locate a basic recording unit or a specific area is largely affected by the configuration and disposition of addressing pits or grooves. Thus, in conventional optical disks adopting a land/groove recording method, in order to locate a physical area without error, both a physical address area and a wobble signal having a predetermined frequency are used in addressing. In oil the case where a physical identifier (ID) header is recorded on a disk, it must be shifted by half a track pitch from the center of a land or groove track to be recorded. Thus, the location of the physical ID header is used in accessing a desired land or groove track.

A conventional recording medium having wobbled groove tracks and a wobble signal picked up from the recording medium will be described, in conjunction with FIGS. 1 through 2B.

FIG. 1 illustrates a conventional recording medium having wobbled groove tracks, wobbled land tracks and physical identifier (PID) areas, in which the wobbled groove tracks and wobbled land tracks each have the same frequency and phase. Since a PID is recorded after it is ed from the center of a land or groove track by half a track pitch, it is used for accessing a desired land or groove track. In other words, it is possible to know whether a track currently being picked up is either a land track or a groove track by using locations of the first PID through the fourth PID prepitted on physical address areas, which are denoted by Header 1 field, Header 2 field, Header 3 field and Header 4 field in the drawing, respectively. Also, the locations of the first PID through the fourth PID can be used as land/groove switching information. In FIG. 1, reference character N denotes the number of sectors for each track. Also, the recording medium shown in FIG. 1 includes a mirror field next to PIDs.

If a track is wobbled, as shown in FIG. 1, a wobble signal can be obtained as a difference signal of two signals output from a photo detector, which typically comprises a bi-divisional photo diode, due to diffracted light from a land track and a groove track. Deviation of a light axis or the tilt of a disk can be obtained using the wobble signal. In other words, as shown in FIG. 2A, a wobble signal is not generated at either a groove track or a land track in a first channel (CH1) corresponding to the sum of two signals output from the photo detector. As shown in FIG. 2B, a wobble signal is generated in a second channel (CH2) corresponding to the difference between two signals of the photo detector. Thus, the wobble signal is generated at the groove track and the land track only in the second channel CH2 corresponding to the difference between signals at opposite side in view of a line parallel to the track. Here, the wobble signal detected from the land track (hereinafter, to be referred to simply as a land wobble signal) and the wobble signal detected from the groove track (hereinafter to be referred to simply as a groove wobble signal) have the same frequency and phase.

Since the physical ID header (hereinafter, to be referred to simply as a PID) is shifted by half a track pitch from the center of a land or groove track to be recorded, in the case of one-beam mastering, position control depending on beam shift and light intensity are different between formation of a groove track and formation of a PID. Even in the case of two-beam mastering, it is quite difficult to precisely control beam position and light intensity. Also, if tilting of a disk occurs, since reproduction characteristics of PIDs in a land track and a groove track are different from each other, additional tilt correction methods must be adopted.

SUMMARY OF THE INVENTION

To solve the above problems, it is an object of the present invention to provide a recording medium having wobbled groove tracks which are out of phase with and have the same frequency as wobbled land tracks having a predetermined frequency.

It is another object of the present invention to provide a servo controlling apparatus for controlling movement of a pickup to a desired physical area in a stable manner, using a wobble signal picked up from a recording medium having wobbled groove tracks which are out of phase with and have the same frequency as wobbled land tracks having a predetermined frequency.

It is still another object of the present invention to provide a servo controlling method for controlling movement of a pickup to a desired physical area in a stable manner using a wobble signal picked up from a recording medium having wobbled groove tracks which are out of phase with and have the same frequency as wobbled land tracks having a predetermined frequency.

Additional objects and advantages of the invention will be set forth in part in the description which follows and, in part, will be obvious from the description, or may be learned by practice of the invention.

Accordingly, to achieve the first and other objects of the present invention, there is provided a recording medium having land tracks and groove tracks, wherein both the land tracks and the groove tracks are wobbled, and wherein the wobbles of either the groove tracks or the land tracks which are a first type of tracks are out of phase with the wobbles of the next other type of track and the wobbles of the other tracks are in phase with the wobbles of the next first type of tracks.

According to another aspect of the present invention, there is provided a recording medium having land tracks and groove tracks, wherein both the land tracks and the groove tracks are wobbled, and wherein the wobbles of individual groove tracks and individual land tracks are out of phase with the wobbles of the next other types of tracks.

To achieve the second and other objects of the present invention, in an optical recording and/or reproducing apparatus having a pickup unit for tracking an optical recording medium, there is provided a servo controlling apparatus including a photo detector to output as two channels a light signal reflected from the optical recording medium wherein the wobbles of either groove tracks or land tracks which are a first type of tracks are out of phase with the wobbles of the next other type of tracks and the wobbles of the other tracks are in phase with the wobbles of the next first type of tracks, or the wobbles of the groove tracks and the land tracks are out of phase with the wobbles of the next other types of tracks, a wobble signal detector to detect a wobble signal from at least one channel from the two channels, a wobble signal determiner to determine whether a track which is currently tracked by the pickup unit is a groove track or a land track, and to provide a determination signal, and a controller to generate a control signal for controlling a servo for moving the pickup unit using the determination signal and the detected wobble signal.

To achieve the third and other objects of the present invention, there is provided a servo controlling method for an optical recording and/or reproducing apparatus having a pickup unit for tracking an optical recording medium, the method including (a) outputting as two channels a light signal reflected from the optical recording medium in which wobbles of either groove tracks or land tracks of the recording medium which are a first type of tracks are out of phase with the wobbles of the next other type of tracks and the wobbles of the other type of tracks are in phase with the wobbles of the next first type of tracks, or the wobbles of the groove tracks and the land tracks are out of phase with the wobbles of the next other types of tracks, (b) detecting a wobble signal from at least one channel from the two channels, (c) determining whether a track which is currently tracked by the pickup unit is a groove track or a land track to provide a determination signal, and (d) controlling a servo for moving the pickup unit using the determination signal and the detected wobble signal.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, a recording medium having wobbled groove tracks which are out of phase with wobbled land tracks, a servo controlling apparatus using a wobble signal and a method thereof, according to the embodiments of the present invention, will be described with reference to the accompanying drawings.

Figure 3:
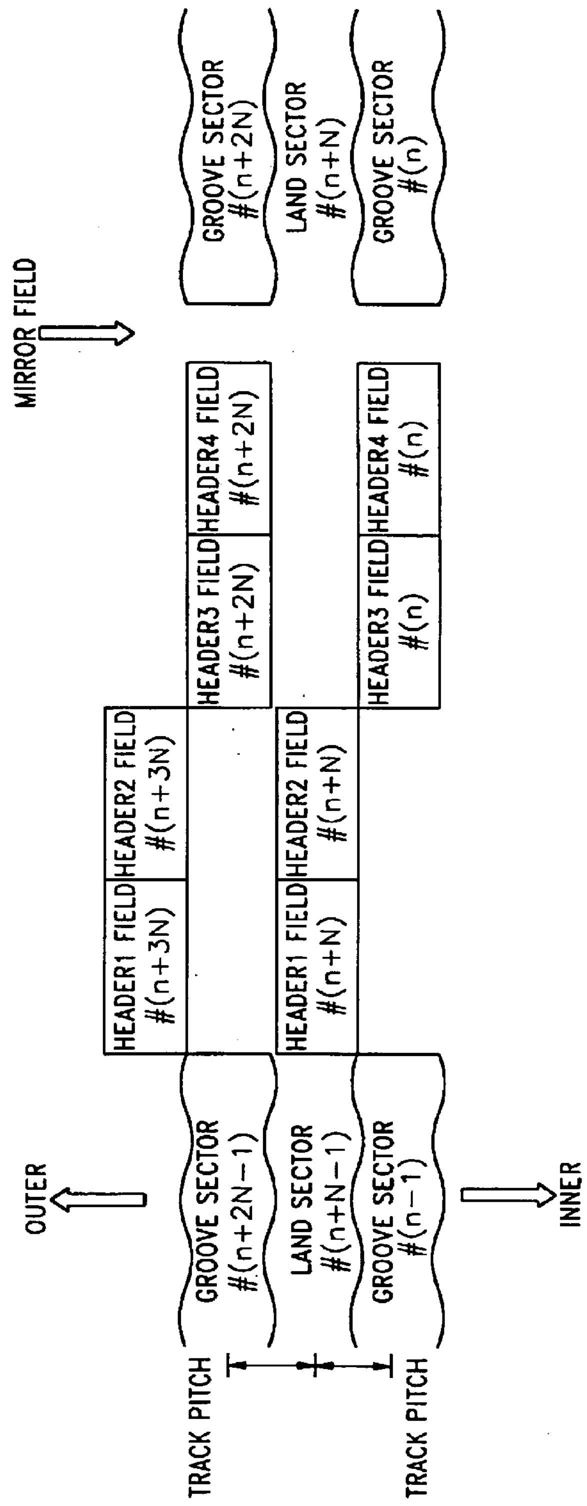
FIG. 3 illustrates a recording medium having wobbled groove tracks which are out of phase with wobbled land tracks according to an embodiment of the present invention.

FIG. 3 shows an exemplary recording medium having wobbled groove tracks which are out of phase with wobbled land tracks according to an embodiment of the present invention. A disk usable in the present invention employs a polycarbonate substrate having a diameter of 120 mm, a thickness of 0.6 mm and a track pitch 0.34 $\mu$m. A light source used herein has a wavelength of 410 nm, and the read power is 0.5 mW.

Figure 1:
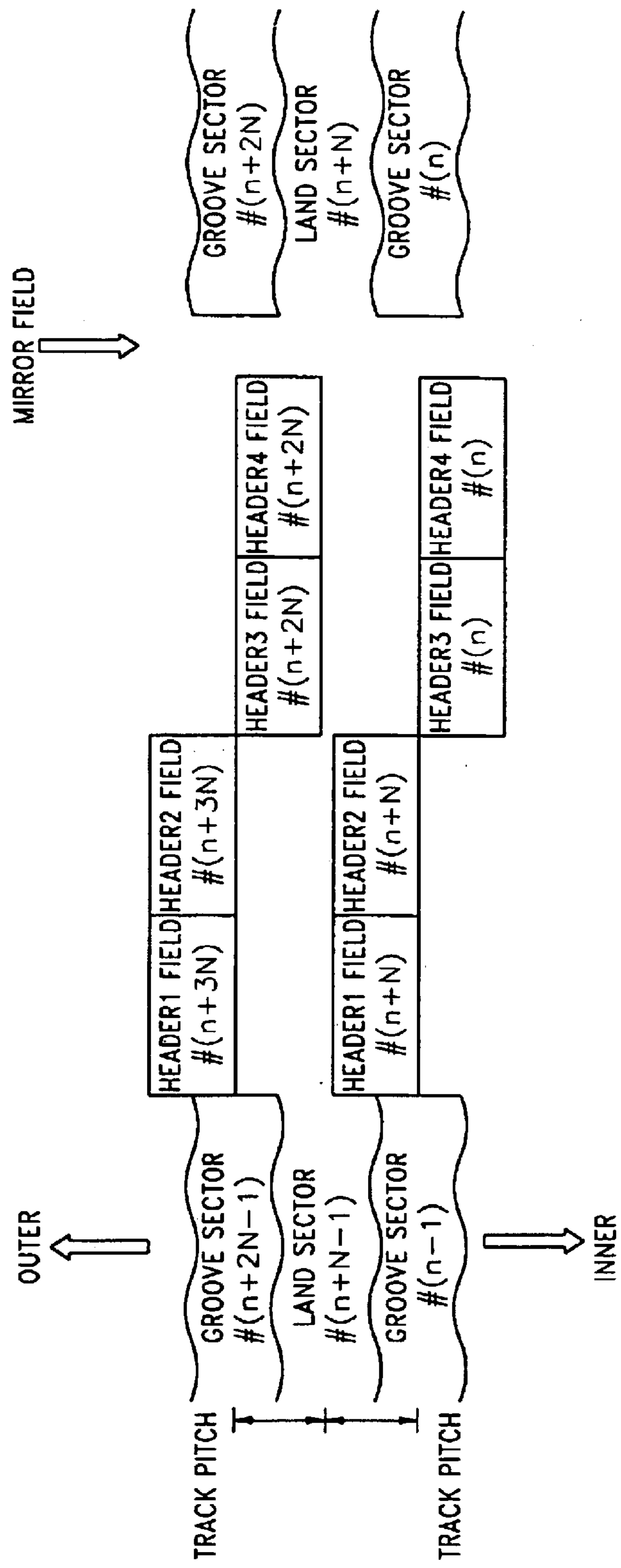
FIG. 1 illustrates a conventional recording medium having wobbled groove tracks, wobbled land tracks and physical identifier (PID) areas.
Figure 2A:
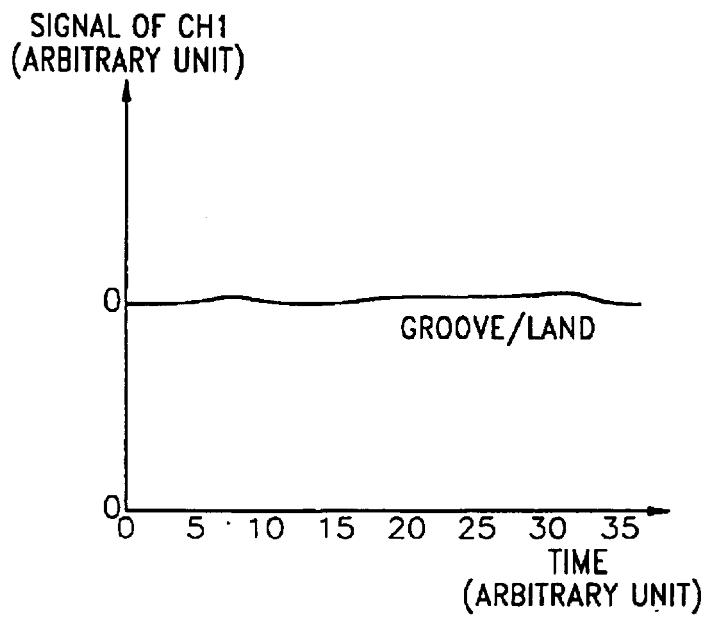
FIGS. 2A and 2B show waveforms output from first and second channels, picked up from the recording medium shown in FIG. 1.
Figure 2B:
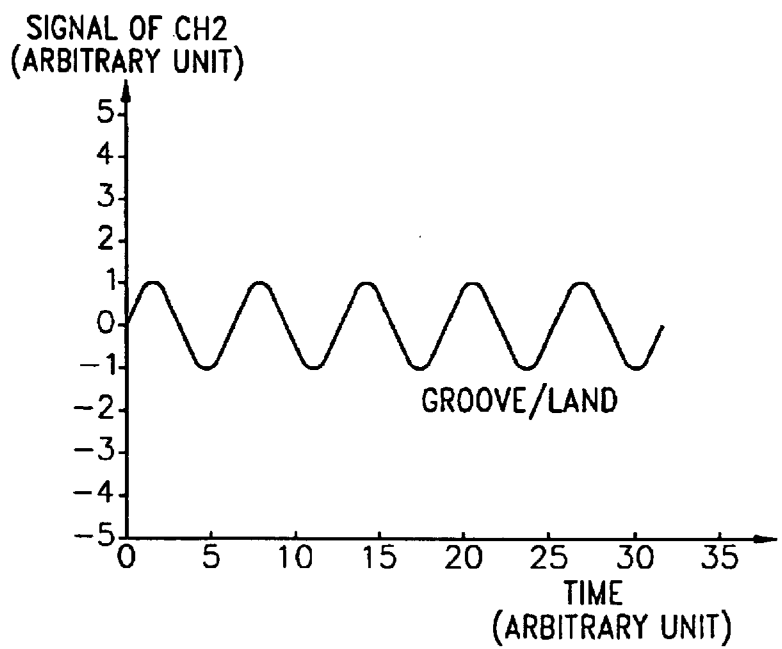

In FIG. 3, a wobble pattern formed on a groove track and a wobble pattern formed on an adjacent land track and vice versa have a phase difference of $\pi$. Thus, the wobbles of each groove track are out of phase by it with respect to those of the next land track and the wobbles of each land track are out of phase by $\pi$ with respect to those of the next groove track. PIDs containing track and section numbers are positioned in the center of the track. Among a plurality of header fields, the first half of the header fields are shifted from the latter half of the header fields by a track pitch. Here, the PID may be recorded after it is shifted from the center of a land track or a groove track by half a track pitch, as shown in FIG. 1.

Figure 4A:
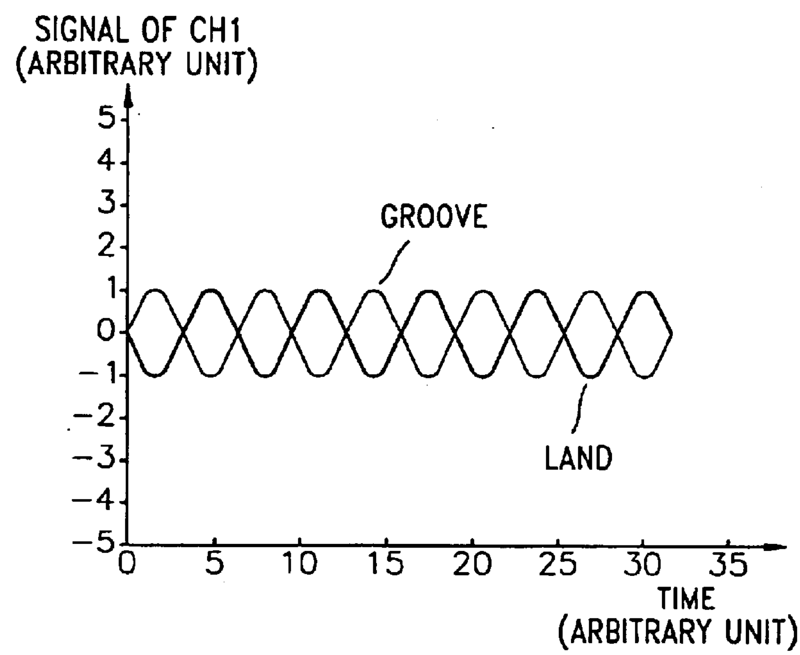
FIGS. 4A and 4B show waveforms output from first and second channels, picked up from the recording medium shown in FIG. 3.
Figure 4B:
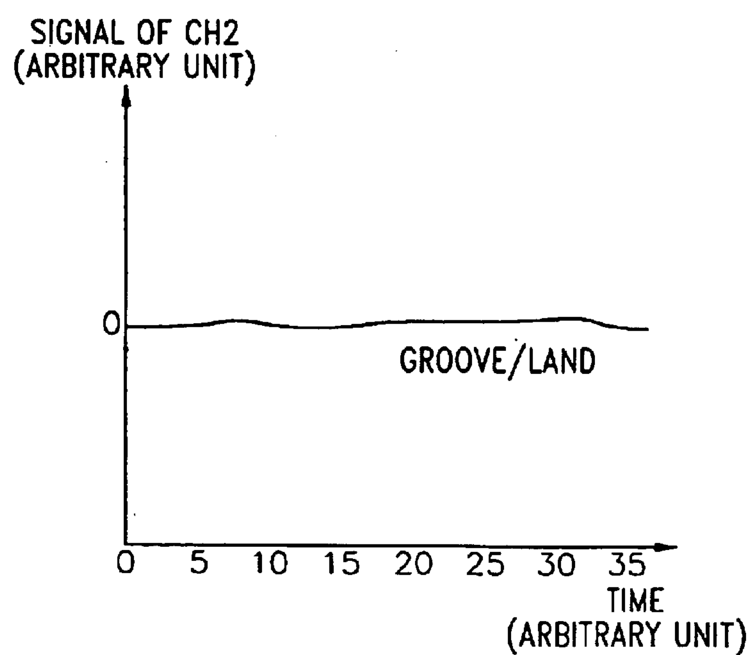

Thus, in an apparatus for recording and/or reproducing the recording medium having a configuration shown in FIG. 3, a groove wobble signal which is out of phase with a next land wobble signal, and the land wobble signal, are output to a first channel CH1 corresponding to the sum of two signals output from a photo detector, as shown in FIG. 4A. In the drawing, the waveform of the groove wobble signal is indicated by a thin line and the waveform of the land wobble signal is indicated by a thick line, which may be reversed. As shown in FIG. 4B, a wobble signal is output at neither the groove track nor the land track in the second channel CH2 corresponding to the difference between the two signals output from the photo detector, i.e., the signals cancel each other out. Thus, all signals can be processed using the signals output to the first channel CH1, including user data, wobble signals and PIDs. Also, the position information of a groove track or a land track can be detected by the difference in phase with the wobble signals output to the first channel CH1.

Referring to FIG. 3, since PIDs are positioned in the center of a track, it is not necessary to refract a beam during mastering. Even if two beams are used, the beam intensity only has to be controlled, but the precise position does not necessarily have to be controlled.

Figure 5:
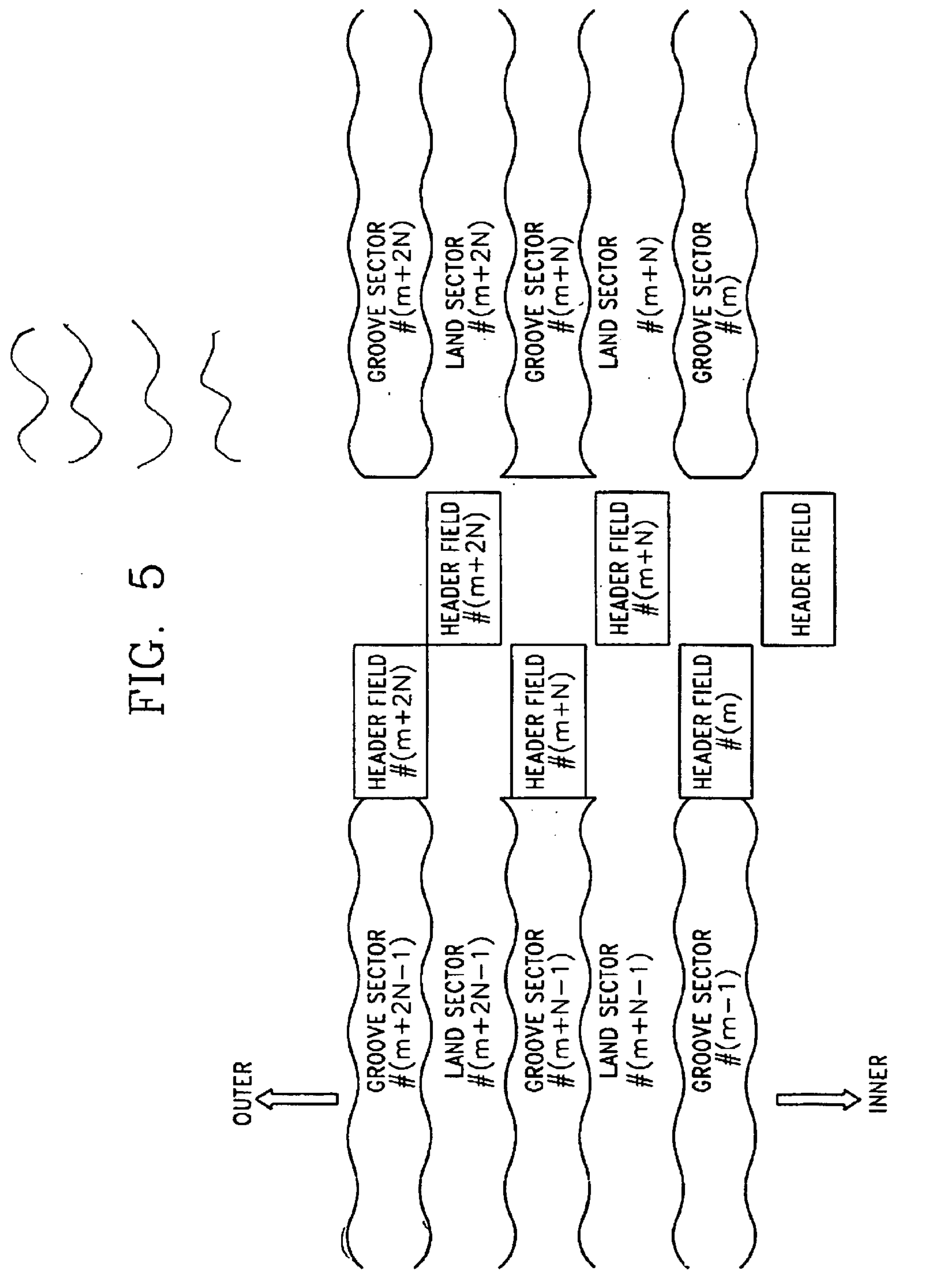
FIG. 5 illustrates a recording medium having wobbled groove tracks which are out of phase with wobbled land tracks according to another embodiment of the present invention.

FIG. 5 illustrates a recording medium having wobbled groove tracks which are out of phase with wobbled land tracks according to another embodiment of the present invention, in which the wobbles of individual groove tracks are out of phase by π and the wobbles of individual land tracks are in phase. In other words, the wobbles of each groove track are out of phase by π with respect to those of a very next land track, and the wobbles of each land track are in phase with those of a very next groove track. Also, the phases of wobble signals even in an identical groove track are alternately opposite in a radial direction, and the phases of wobble signals even in an identical land track are alternately opposite in a radial direction. In other words, the differences in the wobble phases between a groove track and the very next groove track and between a land track and the very next land track are π.

Generally, the data having information are recorded on only the groove tracks of rewritable disks are shown in FIG. 5. However, if the data having information are recorded only on the lands tracks, then alternatively, the wobbles of individual land tracks may be out of phase by π and the wobbles of individual groove tracks may be in phase. In other words, the wobbles of each land track are out of phase by π with respect to those of the next groove track, and the wobbles of each groove track are in phase with respect to those of the next land track. Likewise, the differences in the wobble phases between a groove track and the directly next groove track and between a land track and the very next land track are π.

A PID area containing track and section numbers may coincide with the center of a track. Otherwise, as shown in FIG. 1, the PID area may be shifted from the center of a land track or a groove track by half a track pitch. If the PID area coincides with the center of a track, beam refraction is not necessary during mastering, nor is it necessary to use two beams. Even if two beams are used, the beam intensity only has only to be controlled, but position control does not necessarily have to be controlled.

Figure 6A:
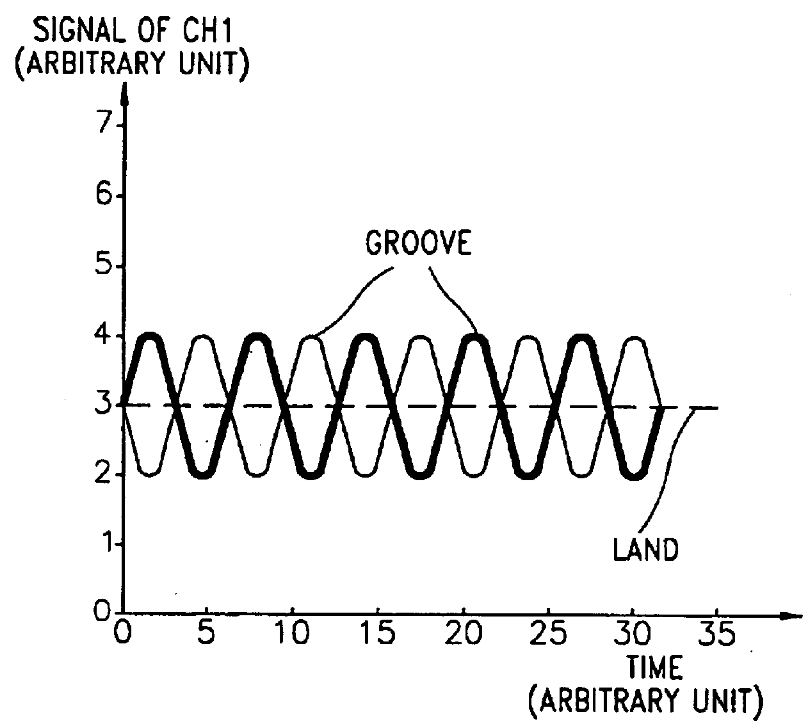
FIGS. 6A and 6B show waveforms output from first and second channels, picked up from the recording medium shown in FIG. 5.
Figure 6B:
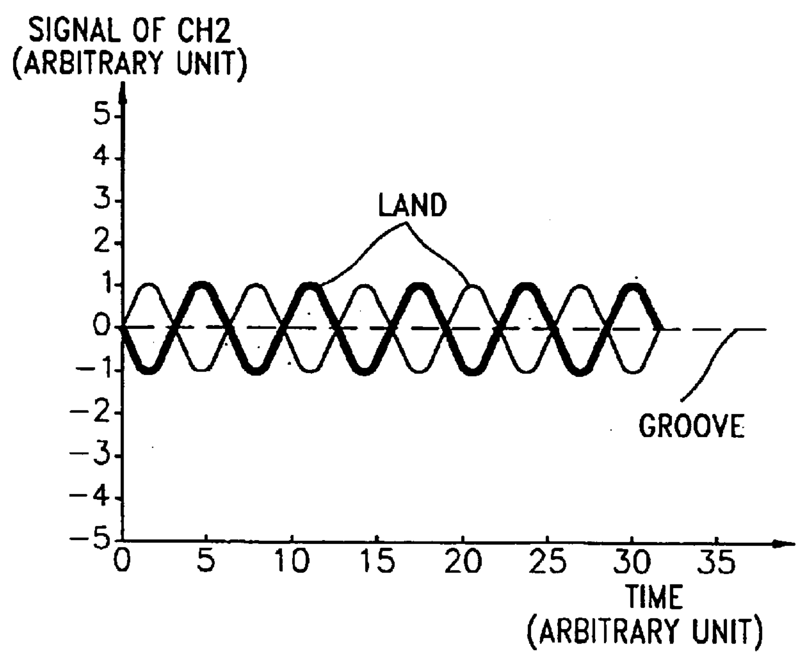

Thus, in an apparatus for recording on/reproducing from a recording medium having a configuration shown in FIG. 5, that is, the wobbles of individual groove tracks are out of phase by π with the wobbles of the next land tracks and the wobbles of individual land tracks are in phase with the wobbles of the next groove tracks, a groove wobble signal is output to a first channel CH1 corresponding to the sum of two signals output from a photo detector, as shown in FIG. 6A. Also, as shown in FIG. 6B, a land wobble signal is output to the second channel CH2 corresponding to the difference between two signals output from the photo detector. Likewise, in the recording medium on which the wobbles of individual land tracks are out of phase by π with the wobbles of the next groove tracks and the wobbles of individual groove tracks are in phase with the wobbles of the next land tracks, a land wobble signal is output to the first channel CH1 and a groove wobble signal is output to the second channel CH2.

Thus, it is possible to determine whether a track currently being picked up is either a groove track or a land track, using the wobble signals of the first and second channels CH1 and CH2. Also, it is possible to control movement of a pickup to a desired physical area in a stable manner using both the wobble signals output to the first and second channels CH1 and CH2 and the PID generated in the center of the track. Further, in not only a rewritable disk but also a read-only disk, when the position of the pickup is switched from the land track to a groove track, or when the position of the pickup is switched from the groove track to a land track, the wobble signals output from the first and second channels CH1 and CH2 can be effectively used for servo control.

Figure 7:
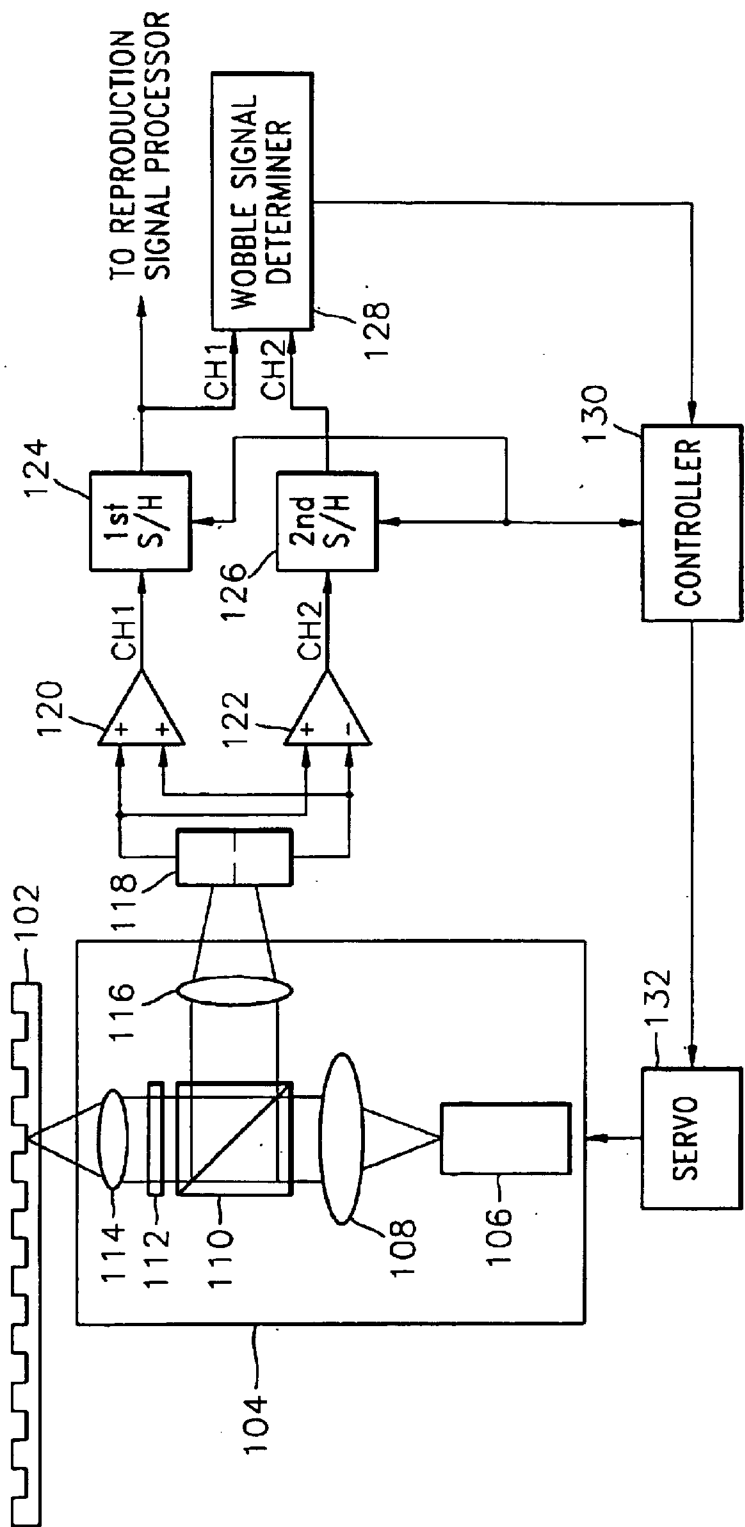
FIG. 7 is a circuit diagram of a servo controlling apparatus for controlling a pickup using a wobble signal according to the embodiments of the present invention.

FIG. 7 is a block diagram of a servo controlling apparatus for controlling a pickup according to the embodiments of the present invention, in the case of using the recording medium shown in FIG. 5. In FIG. 7, the servo controlling apparatus uses a recording medium 102, and includes a pickup unit 104, a photo detector 118, first and second differential amplifiers 120 and 122, first and second sample-and-hold (S/H) circuits 124 and 126, a wobble signal determiner 128, a controller 130 and a servo unit 132. Here, the first and second differential amplifiers 120 and 122, and the first and second S/H circuits 124 and 126 can be collectively referred to as a wobble signal detector.

Now, the flow of a laser beam of the pickup unit 104 will be described. That is to say, a linearly polarized beam having an electrical field polarization plane parallel to the surface of a horizontal plane (surface of the earth) is emitted from a semiconductor laser 106. Thus, the beam spread elliptically is collimated by a collimator 108, which is also called a coupling lens.

In such a manner, the linearly polarized laser beam having a polarization plane parallel to the surface of the horizontal plane passes through a beam splitter 110 and an optical isolator which consists of a ¼ wavelength plate 112 to then be a circular, polarized beam. The circular polarized beam passes through an objective lens 114 to then be incident on the recording medium (the disk shown in FIG. 5) 102. The circular, polarized beam is reflected from a the recording medium 102 (disk) so that it passes through again the objective lens 114 and ¼ wavelength plate 112 to then become a linearly polarized beam having a polarization plane perpendicular to the surface of the horizontal plane. Then, the linearly polarized beam is reflected from the beam splitter 110 to be directed toward a focusing lens, which is also called a detecting lens 116. Here, the beam incident on the recording medium 102 is a polarized beam, but a nonpolarized beam may be incident the recording medium 102.

The photo detector 118 divides a light signal emitted through the focusing lens 116 into two (electrical) signals and supplies the two divided signals to the first and second differential amplifiers 120 and 122. The photo detector 118 comprises a bi-divisional photo diode such that a characteristic of the photo diode is to divide the light signal into the two signals. The first differential amplifier 120 supplies the sum of the two signals of the photo detector 118 to the first S/H circuit 124 through a first channel CH1, and the second differential amplifier 122 supplies the difference between the two signals of the photo detector 118 to the second S/H circuit 126 through a second channel CH2.

The groove (or land) wobble signal detected from the first channel CH1, output from the first S/H circuit 124 is supplied to the wobble signal determiner 128 and the controller 130.

Also, the PID detected from the first channel CH1 through the first S/H circuit 124 is supplied to the controller 130, and a reproduction signal is supplied to a reproduction signal processor (not shown). The land (or groove) wobble signal detected from the second channel CH2, output from the second S/H circuit 126 is supplied to the wobble signal determiner 128 and the controller 130. Also, the controller 130 controls the timing of the first and second S/H circuits 124 and 126.

If a wobble signal is detected from the first channel CH1, the wobble signal determiner 128 determines that the wobble signal is in a groove (or land) track. If a wobble signal is detected from the second channel CH2, the wobble signal determiner 128 determines that the wobble signal is in a land (or groove) track. The controller 130 generates a control signal for controlling the servo unit 132 so that the pickup unit is moved to a desired physical area in a stable manner in accordance with a determination signal supplied from the wobble signal determiner 128, the groove (or land) wobble signal and the PID detected from the first channel CH1 through the first S/H circuit 124, and the land (or groove) wobble signal detected from the second channel CH2 through the second S/H circuit 126. The control signal may be a signal for controlling the revolution speed of a spindle motor or a signal for controlling a tracking servo.

Therefore, in the present invention, if a pickup unit is currently tracking a groove (or land) track, a wobble signal is output to the first channel CH1. If a pickup unit is currently tracking a land (or groove) track, a wobble signal is output to the second channel CH2. Also, since the phases of wobbles of individual groove tracks and individual land tracks are alternated, it is possible to discriminate whether the groove or land track number is an odd number or an even number, thereby ensuring addressing.

The servo controlling apparatus described in FIG. 7 is used when utilizing the recording medium shown in FIG. 3 as well. The groove wobble signal and the land wobble signal are detected only from the first channel CH1, output from the first S/H circuit 124, whereas in the case of using the recording medium shown in FIG. 5, the groove (or land) wobble signal is detected from the first channel CH1 output from the first S/H circuit 124, and the land (or groove) wobble signal is detected from the second channel CH2 output from the second S/H circuit 126.

Also, in a read-only disk adopting a land/groove recording method, the wobble signals of both first and second channels are used as switching signals between a groove track and a land track. Thus, PIDs having desired information can be recorded on a precise position by using only a track number and a sector number during mastering.

As described above, a groove track or a land track is determined from a recording medium having wobbled groove tracks which are out of phase with wobbled land tracks using wobble signals of two channels. Also, it is possible to determine whether a groove (or land) track number is an odd number or an even number. Thus, addressing is ensured and servo control can be effectively performed.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A servo controller in an optical recording and/or reproducing apparatus including a pickup unit for tracking an optical recording medium having wobbled groove and land tracks and a physical identifier area (PID) which identifies a beginning of a track having information recorded thereon, wherein individual land tracks are arranged alternately with individual groove tracks, each individual land track and each individual groove track having respective first and second wobbles, the first and second wobbles of each individual groove track being out of phase with respect to each other and in phase with the first and second wobbles, respectively, of a next individual groove track, and the first and second wobbles of each individual land track being out of phase with respect to each other, the servo controller comprising:

a photo detector which outputs first and second light signals reflected from the optical recording medium;

a wobble signal detector which detects the PID and a wobble signal from one of the first and second light signals;

a wobble signal determiner which determines whether the wobble signal corresponds to a land or a groove based on determining a phase of the wobble signal and which of the first and second light signals includes the wobble signal, and outputs a determination signal; and a controller which generates a control signal to control a servo for moving the pickup unit based on the determination signal, the detected wobble signal, and the detected PID.

2. A servo controller in an optical recording and/or reproducing apparatus including a pickup unit for tracking an optical recording medium having wobbled groove and land tracks and a physical identifier area (PID) which identifies a beginning of a track having information recorded thereon, wherein individual land tracks are arranged alternately with individual groove tracks, each individual land track and each individual groove track having respective first and second wobbles, the first and second wobbles of each individual land track being out of phase with respect to each other and in phase with the first and second wobbles, respectively, of a next individual land track, and the first and second wobbles of each individual groove track being out of phase with respect to each other, the servo controller comprising:

a photo detector which outputs first and second light signals reflected from the optical recording medium;

a wobble signal detector which detects the PID and a wobble signal from one of the first and second light signals;

a wobble signal determiner which determines whether the wobble signal corresponds to a land or a groove based on determining a phase of the wobble signal and which of the first and second light signals includes the wobble signal, and outputs a determination signal; and a controller which generates a control signal to control a servo for moving the pickup unit based on the determination signal, the detected wobble signal, and the detected PID.

3. A method of controlling a servo in an optical recording and/or reproducing apparatus including a pickup unit for tracking an optical recording medium having wobbled groove and land tracks and a physical identifier area (PID) which identifies a beginning of a track having information recorded thereon, wherein individual land tracks are arranged alternately with individual groove tracks, each individual land track and each individual groove track having respective first and second wobbles, the first and second wobbles of each individual groove track being out of phase with respect to each other and in phase with the first and second wobbles, respectively, of a next individual groove track, and the first and second wobbles of each individual land track being out of phase with respect to each other, the servo controller comprising:

detecting first and second light signals reflected from the optical recording medium;

detecting the PID and a wobble signal from one of the first and second light signals;

determining whether the wobble signal corresponds to a land or a groove based on determining a phase of the wobble signal and which of the first and second light signals includes the wobble signal, and outputting a determination signal; and generating a control signal to control a servo for moving the pickup unit based on the determination signal, the detected wobble signal, and the detected PID.

4. A method of controlling a servo in an optical recording and/or reproducing apparatus including a pickup unit for tracking an optical recording medium having wobbled groove and land tracks and a physical identifier area (PID) which identifies a beginning of a track having information recorded thereon, wherein individual land tracks are arranged alternately with individual groove tracks, each individual land track and each individual groove track having respective first and second wobbles, the first and second wobbles of each individual land track being out of phase with respect to each other and in phase with the first and second wobbles, respectively, of a next individual land track, and the first and second wobbles of each individual groove track being out of phase with respect to each other, the servo controller comprising:

detecting first and second light signals reflected from the optical recording medium;

detecting the PID and a wobble signal from one of the first and second light signals;

determining whether the wobble signal corresponds to a land or a groove based on determining a phase of the wobble signal and which of the first and second light signals includes the wobble signal, and outputting a determination signal; and generating a control signal to control a servo for moving the pickup unit based on the determination signal, the detected wobble signal, and the detected PID.

* * * * *